W. SMALL.
Plow.
No. 1,133.  Patented Apr. 23, 1839.
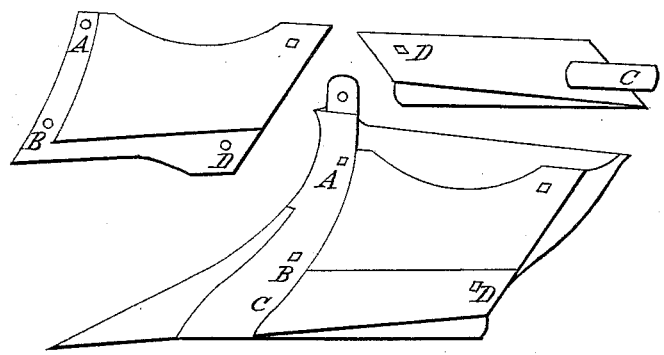

UNITED STATES PATENT OFFICE.

JOHN SMALL, OF NORTH ARGYLE, NEW YORK, ADMINISTRATOR OF THE ESTATE OF WILLIAM SMALL.

IMPROVEMENT IN PLOWS.

Specification forming part of Letters Patent No. 1,133, dated April 22, 1839.

*To all whom it may concern:*

Be it known that I, WILLIAM SMALL, of North Argyle, in the county of Washington and State of New York, have invented a new and useful Improvement on the Plow; and I hereby declare that the following is a full and exact description.

The nature of my invention consists in making the landside of the plow in two pieces; the lower part (what I call a "shoe") is made thick and strong. It will last long and be renewed at little expense. It is also important in keeping the plow in an equal temperament.

To enable others to use my invention, I will proceed to describe its construction.

I construct my plow to be easily drawn, going into the ground in the form of a long wedge. The furrow rises on the share and mold-board on an inclined plane, laying it over to the angle of forty-five degrees. The sheth and mold-board are cast in one piece. The share is spliced over the fore part of the mold-board and fixed by one bolt. The upper piece of the landside is lapped over the inside of the sheth and fixed by two bolts, (shown at A and B on the accompanying drawing.) The lower piece of the landside is fixed by a hook inside of the sheth at C, and the hind end is lapped over the upper piece and fixed with the same bolt, D, that would be needful though the landside were in one piece. My plow thus put together is twenty-two inches long on the bottom, nine inches wide behind. The share is twelve inches long on the wing, rounding outward a little to the point, where it is one inch broad. The upper part of the share is sharp, supplying the place of a cutter. The height of the plow is fifteen inches below the beam.

What I claim as my invention, and desire to secure by Letters Patent, is—

The mode of securing the lower piece of the landside by means of a hook in the fore end, C, and in the hind end by lapping over the upper piece and fixing it by the same bolts that would be needful though the landside were in one piece, in the manner herein described.

WILLIAM SMALL.

Witnesses:
EDWARD DODD,
WM. H. KING.